Patented Aug. 27, 1946

2,406,591

UNITED STATES PATENT OFFICE 2,406,591

MIXTURES OF ISOMERIC TRIAZOLE DERIVATIVES AND PROCESS OF PREPARING THE SAME

Gaetano F. D'Alelio, Northampton, Mass., assignor to General Electric Company, a corporation of New York No Drawing. Application August 31, 1944,
Serial No. 552,202

12 Claims. (Cl. 260—308)

This invention relates to the production of new and useful compositions comprising a mixture of isomeric compounds, more particularly isomeric triazole derivatives. Specifically the invention is concerned with compositions comprising a mixture of isomers represented by A and B, each of which corresponds to the general formula

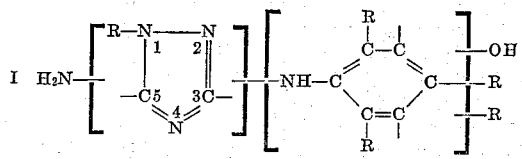

where R represents a member of the class consisting of hydrogen and monovalent hydrocarbon radicals, in isomer A the —NH₂ grouping being attached to the carbon atom in the 3 position of the triazole nucleus and in isomer B to the carbon atom in the 5 position of the triazole nucleus.

Illustrative examples of monovalent hydrocarbon radicals that R in the above formula may represent are: aliphatic (e. g., methyl, ethyl, propyl, isopropyl, butyl, sec.-butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tert.-butylphenyl, methylnaphthyl, etc.); and aryl-substituted aliphatic (e. g., benzyl, cinnamyl, phenylethyl, phenylpropyl, etc.). Preferably R represents hydrogen, in which case each of the isomers A and B in the mixture corresponds to the general formula

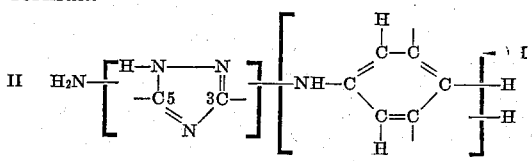

the —NH₂ grouping being attached, in one isomer, to the carbon atom in the 3 position and in the other, to the carbon atom in the 5 position of the triazole nucleus. However, there also may be produced in accordance with the present invention a mixture of isomers represented by A and B, each of which corresponds to the general formula

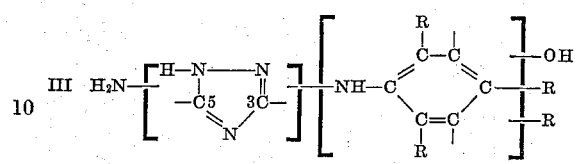

or wherein each isomer of the mixture corresponds to the general formula

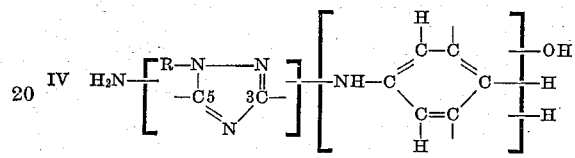

In Formulas III and IV, R has the same meaning as given above with reference to Formula I and the —NH₂ grouping of each isomer is attached to the triazole nucleus as hereinbefore mentioned with reference to Formulas I and II.

The mixtures of isomeric compounds of this invention may be used, for example, as pharmaceuticals, insecticides, fungicides, plasticizers and as intermediates in the preparation of mixtures of derivatives of the isomers, e. g., ureido, hydrazino, acyl, carbamyl, methylol, methylene, etc., derivatives. These new isomeric mixtures, without separation of the individual isomers, are especially valuable in the preparation of synthetic resinous compositions. Thus, they may be condensed with, for instance, aldehydes, including polymeric aldehydes, hydroxyaldehydes and aldehyde-addition products, to yield condensation products having particular utility in the plastics and coating arts. Such reaction products are more fully described and are specifically claimed in my copending application, Serial No. 552,201, filed concurrently herewith and assigned to the same assignee as the present invention.

Various methods may be employed to produce the mixture of isomers of this invention. I prefer to prepare my new compositions by effecting reaction under heat between (1) a hydrazine corresponding to the general formula

V      $NH_2—NHR$ where R has the same meaning as given above with reference to Formula I and (2) a hydroxyaryl biguanide corresponding to the general formula VI 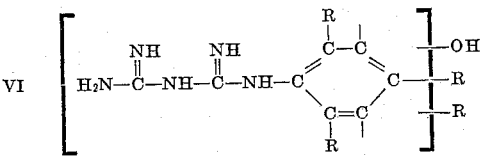

where R has the same meaning specified above with reference to Formula I. This reaction is carried out under conditions such as will result in the formation of ammonia or, if an acid is present, an ammonium salt as a by-product of the reaction. The reaction may be represented by the following general equation:

VII 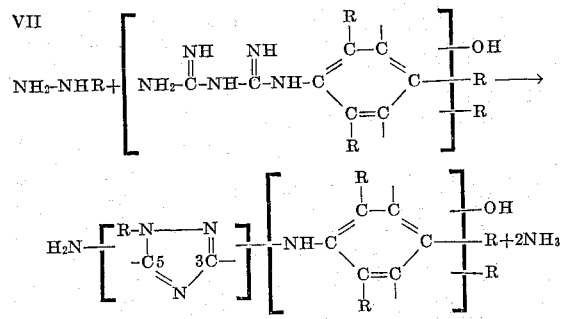

Or, when the reaction is carried out in the presence of an acid effective in binding the ammonia liberated during the reaction, it may be represented by the following general equation:

VIII 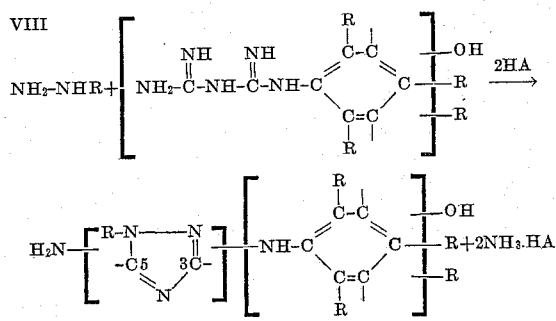

In Equations VII and VIII, R has the same meaning as given above with reference to Formula I, and HA (Equation VIII) represents an acid, which may be either organic or inorganic but which preferably is inorganic. Illustrative examples of organic and inorganic acids that may be used to bind the ammonia in the form of a salt are oxalic, acetic, hydrochloric, hydrobromic, sulfuric, etc. The reaction preferably is carried out in an aqueous solution containing an inorganic acid. However, other solvents or mixtures of solvents may be used, e. g., alcohols, ethers, dioxane, benzene, etc. The reaction may be effected under a variety of temperature and pressure conditions. Ordinarily the components are caused to react at atmospheric pressure under reflux at the boiling temperature of the reaction mass.

Illustrative examples of hydrazines that may be used, depending upon the particular end product desired, are:

Hydrazine (or hydrazine hydrate)
Methyl hydrazine
Ethyl hydrazine
Propyl hydrazine
Isobutyl hydrazine
Phenyl hydrazine
Allyl hydrazine
Propenyl hydrazine
Cyclohexyl hydrazine
Tolyl hydrazine
Xylyl hydrazine
Phenethyl hydrazine
Ethylphenyl hydrazine
Octyl hydrazine Illustrative examples of hydroxyaryl biguanides that may be employed, depending upon the particular end product desired, are:

Meta-hydroxyphenyl biguanide
Para-hydroxyphenyl biguanide
(3-methyl 4-hydroxyphenyl) biguanide, which also may be named (4-hydroxyphenyl 5-methyl) biguanide
(2-methyl 4-hydroxyphenyl) biguanide
(3-hydroxy 4-methylphenyl) biguanide
(3-ethyl 4-hydroxyphenyl) biguanide
(2-ethyl 3-hydroxyphenyl) biguanide
(3-hydroxy 4-propylphenyl) biguanide
(3-isopropyl 4-hydroxyphenyl) biguanide
(3-hydroxy 4-octylphenyl) biguanide
(3-allyl 4-hydroxyphenyl) biguanide
(3-hydroxy 4-propenylphenyl) biguanide
(3-phenyl 4-hydroxyphenyl) biguanide
(3-hydroxy 4-benzylphenyl) biguanide
(3-phenethyl 4-hydroxyphenyl) biguanide
(3-cyclopentyl 4-hydroxyphenyl) biguanide
(3-hydroxy 4-cyclohexenylphenyl) biguanide
(3-hydroxy 4,5-dimethylphenyl) biguanide
(2,4-dimethyl 3-hydroxyphenyl) biguanide
(2,6-dimethyl 3-hydroxyphenyl) biguanide
(4-hydroxy 3,5-dimethylphenyl) biguanide
(3-hydroxy 4,5-diethylphenyl) biguanide
(4-hydroxy 3,5-diethylphenyl) biguanide The hydroxyaryl biguanides used in practicing the present invention are prepared by methods such as described, for example, in Beilstein Organische Chemie, 4th ed., 13, 478.

In order that those skilled in the art better may understand how the present invention may be carried into effect, the following examples are given by way of illustration and not by way of limitation. All parts are by weight.

*Example 1*

This example illustrates the preparation of a composition comprising a mixture of 3-amino 5-(para-hydroxyanilino) 1,2,4-triazole and 3-(para-hydroxyanilino) 5-amino 1,2,4-triazole, which isomers also may be named, respectively, as 3-amino 5-(para-hydroxyphenylamino) 1,2,4-triazole and 3-(para-hydroxyphenylamino) 5-amino 1,2,4-triazole.

|  | Parts |
|---|---|
| Para-hydroxyphenyl biguanide hydrochloride | 114.8 |
| Hydrazine hydrate (in 34.5 parts water) | 25.0 |
| Concentrated aqueous solution of hydrochloric acid (approx. 38% HCl) | 96.0 | were mixed with 200 parts water, and the resulting mixture then heated under reflux at the boiling temperature of the mass for 18 hours. The solid residue obtained by evaporating the resulting liquid mass to dryness was dissolved in hot ethyl alcohol. After cooling, the insoluble ammonium chloride that separated from the alcohol solution was removed by filtration. The filtrate was decolorized by contacting the heated filtrate with a finely divided decolorizing carbon. Ether was added to the decolorized filtrate, from which the decolorizing carbon previously had been removed, until precipitation began to take place. The mass was chilled, and the resulting white, crystalline material that precipitated was removed by filtration and dried. A yield of 100 parts of the dried material was obtained. The crystalline product comprising a mixture of 3-amino 5-(para-hydroxyanilino) 1,2,4-triazole and 3-(para-hydroxyanilino) 5-amino 1,2,4-triazole melted at 135° to 137° C.

Instead of using 114.8 parts of para-hydroxyphenyl biguanide hydrochloride, 96.8 parts of para-hydroxyphenyl biguanide may be employed, in which case the amount of the concentrated aqueous solution of hydrochloric acid is increased from 96 parts to 192 parts.

*Example 2*

A composition comprising a mixture of 3-amino 5-(meta-hydroxyanilino) 1,2,4-triazole and 3-(meta-hydroxyanilino) 5-amino, 1,2,4-triazole is produced by the same method described under Example 1 with the exception that 114.8 parts of meta-hydroxyphenyl biguanide hydrochloride are used in place of 114.8 parts of para-hydroxyphenyl biguanide hydrochloride.

*Example 3*

A composition comprising a mixture of 1-phenyl 3-amino 5-(para-hydroxyanilino) 1,2,4-triazole and 1-phenyl 3-(para-hydroxyanilino) 5-amino 1,2,4-triazole is prepared by the same method set forth under Example 1 with the exception that 54 parts of phenyl hydrazine are used instead of 25 parts of hydrazine hydrate.

Illustrative examples of other isomeric mixtures that may be produced in accordance with the present invention, the individual isomers of which are embraced by Formula I, are mixtures comprising:

1-methyl 3-amino 5-(meta-hydroxyanilino) 1,2,4-triazole and 1-methyl 3-(meta-hydroxyanilino) 5-amino 1,2,4-triazole 1-phenyl 3-amino 5-(meta-hydroxyanilino) 1,2,4-triazole and 1-phenyl 3-(meta-hydroxyanilino) 5-amino 1,2,4-triazole 3-amino 5-(3'-methyl 4'-hydroxyphenylamino) 1,2,4-triazole and 3-(3'-methyl 4'-hydroxyphenylamino) 5-amino 1,2,4-triazole 3-amino 5-(2'-methyl 4'-hydroxyphenylamino) 1,2,4-triazole and 3-(2'-methyl 4'-hydroxyphenylamino) 5-amino 1,2,4-triazole 3-amino 5-(2'-ethyl 3'-hydroxyphenylamino) 1,2,4-triazole and 3-(2'-ethyl 3'-hydroxyphenylamino) 5-amino 1,2,4-triazole 3-amino 5-(3'-phenyl 4'-hydroxyphenylamino) 1,2,4-triazole and 3-(3'-phenyl 4'-hydroxyphenylamino) 5-amino 1,2,4-triazole 3-amino 5-(3',5'-dimethyl 4'-hydroxyphenylamino) 1,2,4-triazole and 3-(3',5'-dimethyl 4'-hydroxyphenylamino) 5-amino 1,2,4-triazole 3-amino 5-(2',4'-dimethyl 3'-hydroxyphenylamino) 1,2,4-triazole and 3-(2',4'-dimethyl 3'-hydroxyphenylamino) 5-amino 1,2,4-triazole 3-amino 5-(3',4'-diethyl 5'-hydroxyphenylamino) 1,2,4-triazole and 3-(3',4'-diethyl 5'-hydroxyphenylamino) 5-amino 1,2,4-triazole 1-methyl 3-amino 5-(2',6'-dimethyl 3'-hydroxyphenylamino) 1,2,4-triazole and 1-methyl 3-(2',6'-dimethyl 3'-hydroxyphenylamino) 5-amino 1,2,4-triazole 1-ethyl 3-amino 5-(3'-methyl 4'-hydroxyphenylamino) 1,2,4-triazole and 1-ethyl 3-(3'-methyl 4'-hydroxyphenylamino) 5-amino 1,2,4-triazole 1-tolyl 3-amino 5-(para-hydroxyanilino) 1,2,4-triazole and 1-tolyl 3-(para-hydroxyanilino) 5-amino 1,2,4-triazole 1-ethyl 3-amino 5-(para-hydroxyanilino) 1,2,4-triazole and 1-ethyl 3-(para-hydroxyanilino) 5-amino 1,2,4-triazole 1-phenyl 3-amino 5-(3'-methyl 4'-hydroxyphenylamino) 1,2,4-triazole and 1-phenyl 3-(3'-methyl 4'-hydroxyphenylamino) 5-amino 1,2,4-triazole 1-allyl 3-amino 5-(para-hydroxyanilino) 1,2,4-triazole and 1-allyl 3-(para-hydroxyanilino) 5-amino 1,2,4-triazole 1-benzyl 3-amino 5-(meta-hydroxyanilino) 1,2,4-triazole and 1-benzyl 3-(meta-hydroxyanilino) 5-amino 1,2,4-triazole

What I claim as new and desire to secure by Letters Patent of the United States is:

1. A composition comprising a mixture of isomers represented by A and B, each of which corresponds to the general formula

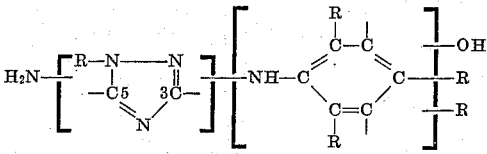

where R represents a member of the class consisting of hydrogen and monovalent hydrocarbon radicals, in isomer A the —NH₂ grouping being attached to the carbon atom in the 3 position of the triazole nucleus and in isomer B to the carbon atom in the 5 position of the triazole nucleus.

2. A mixture of isomers represented by A and B, each of which corresponds to the general formula

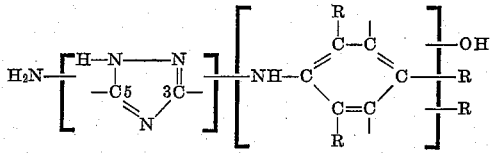

where R represents a member of the class consisting of hydrogen and monovalent hydrocarbon radicals, in isomer A the —NH₂ grouping being attached to the carbon atom in the 3 position of the triazole nucleus and in isomer B to the carbon atom in the 5 position of the triazole nucleus.

3. A mixture of isomers represented by A and B, each of which corresponds to the general formula

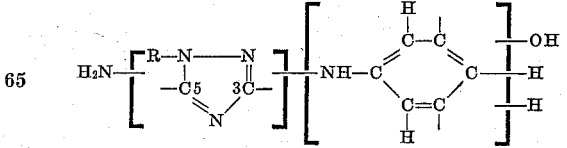

where R represents a member of the class consisting of hydrogen and monovalent hydrocarbon radicals, in isomer A the —NH₂ grouping being attached to the carbon atom in the 3 position of the triazole nucleus and in isomer B to the carbon atom in the 5 position of the triazole nucleus.

4. A composition comprising a mixture of isomers represented by A and B, each of which corresponds to the general formula

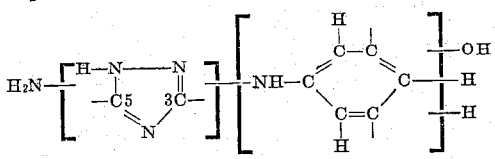

in isomer A the —NH$_2$ grouping being attached to the carbon atom in the 3 position of the triazole nucleus and in isomer B to the carbon atom in the 5 position of the triazole nucleus.

5. A composition comprising a mixture of 3-amino 5-(meta-hydroxyanilino) 1,2,4-triazole and 3-(meta-hydroxyanilino) 5-amino 1,2,4-triazole.

6. A composition comprising a mixture of 3-amino 5-(para-hydroxyanilino) 1,2,4-triazole and 3-(para-hydroxyanilino) 5-amino 1,2,4-triazole.

7. A composition comprising a mixture of 1-phenyl 3-amino 5-(para-hydroxyanilino) 1,2,4-triazole and 1-phenyl 3-(para-hydroxyanilino) 5-amino 1,2,4-triazole.

8. The method of preparing a composition comprising a mixture of isomers represented by A and B, each of which corresponds to the general formula

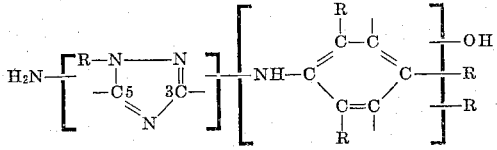

where R represents a member of the class consisting of hydrogen and monovalent hydrocarbon radicals, in isomer A the —NH$_2$ grouping being attached to the carbon atom in the 3 position of the triazole nucleus and in isomer B to the carbon atom in the 5 position of the triazole nucleus, said method comprising effecting reaction under heat between ingredients including (1) a hydrazine corresponding to the general formula NH$_2$—NHR where R has the meaning above given and (2) a hydroxyaryl biguanide corresponding to the general formula

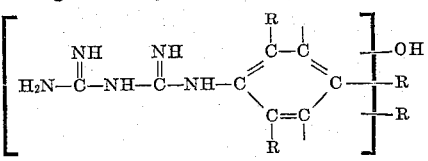

where R has the meaning specified above.

9. A method as in claim 8 wherein the reaction is carried out in the presence of an acid effective in binding the ammonia liberated during the reaction.

10. The method of preparing a composition comprising a mixture of 3-amino 5-(para-hydroxyanilino) 1,2,4-triazole and 3-(para-hydroxyanilino) 5-amino 1,2,4-triazole which comprises effecting reaction under heat between ingredients including para-hydroxyphenyl biguanide and hydrazine hydrate.

11. The method of preparing a composition comprising a mixture of 3-amino 5-(para-hydroxyanilino) 1,2,4-triazole and 3-(para-hydroxyanilino) 5-amino 1,2,4-triazole which comprises effecting reaction under heat between para-hydroxyphenyl biguanide and hydrazine hydrate in the presence of an acid effective in binding the ammonia liberated during the reaction.

12. The method of preparing a composition comprising a mixture of 3-amino 5-(para-hydroxyanilino) 1,2,4-triazole and 3-(para-hydroxyanilino) 5-amino 1,2,4-triazole which comprises effecting reaction under heat between para-hydroxyphenyl biguanide hydrochloride and hydrazine hydrate, the said reaction being carried out in an aqueous solution containing hydrochloric acid in an amount sufficient to bind the ammonia liberated during the reaction.

GAETANO F. D'ALELIO.